H. W. THOMPSON.
Scythe-Snath Fastening.
No. 211,065.  Patented Dec. 17, 1878.
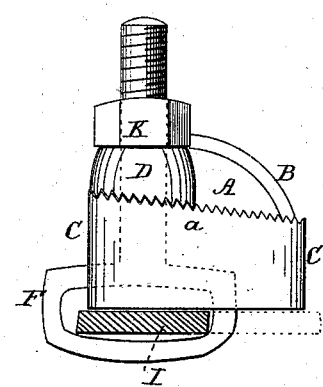
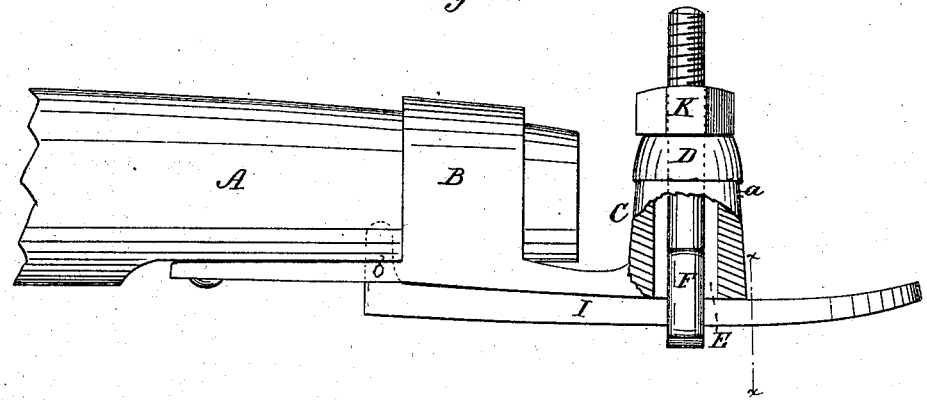

UNITED STATES PATENT OFFICE.

HORACE W. THOMPSON, OF BELLOWS FALLS, VERMONT.

IMPROVEMENT IN SCYTHE-SNATH FASTENINGS.

Specification forming part of Letters Patent No. 211,065, dated December 17, 1878; application filed November 30, 1878.

*To all whom it may concern:*

Be it known that I, HORACE W. THOMPSON, of Bellows Falls, in the county of Windham and State of Vermont, have invented a new and useful Improvement in Scythe-Snath Fastenings; and I do hereby declare that the following is a full, clear, and exact description of the same.

My invention is an improvement in the class of scythe-snath fastenings which set at different angles or inclinations to the snath. It is more particularly an improvement upon the fastening forming the subject of Letters Patent No. 207,164, in which the ferrule attached to the end of a snath has a projecting head or plate, in whose outer end is formed an arc-shaped slot to receive and permit lateral adjustment of the loop or eyebolt which clamps the shank of the scythe.

My invention consists in the form or construction of such head or plate, whereby I produce a better and more secure fastening.

In accompanying drawing, forming part of this specification, Figure 1 is an end view of the fastening applied to a scythe-snath, the shank of the scythe being represented in section. Fig. 2 is a side view of the same, with part of the slotted bar in section.

In said drawing, A indicates the lower end of a scythe-snath; and B, a ferrule, which is applied thereto, and provided with an extension having a thickened head, C, which lies contiguous to the end of the snath, and has an arc-shaped slot, E, formed therein to receive and permit lateral adjustment of the scythe-clamping loop F.

My improvement consists in the form of the bar *a*, constituting the outer portion of said head C, the same being inclined or beveled lengthwise on the under side, so that the bar *a* is of gradually-increasing thickness from left to right, Fig. 1.

The washer D, which is placed on the stem of the screw-eye or scythe-clamping loop F, is similarly beveled on its under side, which lies in contact with said bar *a*.

From this construction it results that when a scythe-shank, I, is passed through the loop F and its nib inserted in the socket *b* it may be secured immovably in any position to which it may be adjusted by screwing up the nut K on the stem of the loop, and thereby clamping the washer against the inclined edge of the bar *a*. If in place of the latter being wedge-shaped it had parallel upper and lower edges it would be difficult to clamp the scythe-shank so tightly as to prevent it slipping or moving slightly out of position laterally when mowing, particularly in heavy grass; but with the present construction the liability of lateral displacement is entirely obviated, since the beveled bar *a*, being interposed between the washer and the shank of the scythe, acts as a wedge, and thus renders it impossible for the washer and clamping-loop to move to the left—*i. e.*, from the scythe-blade. In other words, the beveled edge of the bar *a* operates as an inclined shoulder, which opposes and effectually prevents any lateral movement of the washer to the left, and thus enables the nut, even when screwed lightly home, to hold the scythe rigidly clamped in position.

I propose in some cases to roughen or corrugate either or both edges of the bar *a*, for the purpose of increasing the friction between them and the parts in contact therewith.

What I claim is—

The combination of a snath-ferrule having a slotted head or extension, C, whose outer portion—to wit, the bar *a*—is wedge-shaped, the bevel-faced washer, the nut, and the clamping-loop, substantially as shown and set forth.

The above specification of my invention signed by me this 22d day of November, 1878.

HORACE W. THOMPSON.

Witnesses:
 AMOS W. HART,
 SOLON C. KEMON.